United States Patent [19]

Hughes et al.

[11] Patent Number: 5,638,143
[45] Date of Patent: Jun. 10, 1997

[54] FERROELECTRIC LIQUID CRYSTAL DISPLAY DEVICE WITH A PARTICULAR ANGLE BETWEEN THE POLARIZER OPTICAL AXES AND THE MOLECULAR DIRECTOR

[75] Inventors: Jonathan R. Hughes, Worcester; Harry A. Pedlingham, Malvern, both of United Kingdom

[73] Assignee: The Secretary of State for Defence in Her Britannic Majesty's Government of the United Kingdom of Great Britain and Northern Ireland, a British Corporation Sole, Farnborough, United Kingdom

[21] Appl. No.: 244,935
[22] PCT Filed: Dec. 21, 1992
[86] PCT No.: PCT/GB92/02368
§ 371 Date: Jun. 15, 1994
§ 102(e) Date: Jun. 15, 1994
[87] PCT Pub. No.: WO93/13450
PCT Pub. Date: Jul. 8, 1993

[30] Foreign Application Priority Data

Dec. 23, 1991 [GB] United Kingdom ............... 9127316

[51] Int. Cl.⁶ .................................................. G02F 1/1335
[52] U.S. Cl. ............................................................ 349/100
[58] Field of Search ............................ 359/56, 100, 78, 359/63; 349/100

[56] References Cited

U.S. PATENT DOCUMENTS

| | | | |
|---|---|---|---|
| 4,709,994 | 12/1987 | Kanbe et al. | 359/63 |
| 4,715,688 | 12/1987 | Harada et al. | 359/56 |
| 5,168,381 | 12/1992 | Walba | 359/100 |
| 5,448,383 | 9/1995 | Kanbe et al. | 359/56 |

FOREIGN PATENT DOCUMENTS

| | | |
|---|---|---|
| 0361472 | 4/1990 | European Pat. Off. . |
| 192600 | 3/1991 | Taiwan . |
| 8706020 | 10/1987 | WIPO . |

OTHER PUBLICATIONS

Umeda et al., "Influences . . . Ferrolectric Liquid Crystals", Jap. Journal of Applied Physics, vol. 27, No. 7, Jul. 1988, pp. 1115–1121.

Primary Examiner—William L. Sikes
Assistant Examiner—Charles Miller
Attorney, Agent, or Firm—Nixon & Vanderhye P.C.

[57] ABSTRACT

The invention provides a surface, or electric field, stabilised ferroelectric liquid crystal (SSFLC) device with an improved contrast ratio between its two switched states. The device comprises a liquid crystal cell formed by a thin layer (7), typically 1 to 5 μm thick, of a smectic liquid crystal material, eg a smectic c, held between two glass walls (2, 3) coated on their inner faces with electrodes (5, 6). Polarizers (8, 9) are arranged either side the walls (2, 3). The device is switched between two bistable states by application of unidirectional voltage pulses, with or without the simultaneous application of ac bias voltages. To obtain optimum contrast ratio CR, the optical axis of the polarisers are rotated away from a crossed, or othogonal position. eg by +/−20°, and the cell rotated between the polarisers (8, 9); the precise optimum rotation depends upon material, and ac bias voltage.

9 Claims, 5 Drawing Sheets

FERROELECTRIC LIQUID CRYSTAL DISPLAY DEVICE WITH A PARTICULAR ANGLE BETWEEN THE POLARIZER OPTICAL AXES AND THE MOLECULAR DIRECTOR

BACKGROUND OF THE INVENTION

1. Field of the Invention

This invention relates to ferroelectric liquid crystal display devices, specifically a device with improved contrast ratios.

2. Discussion of Prior Art

Liquid crystal display devices are well known. They typically comprise a liquid crystal cell formed by a thin layer of a liquid crystal material held between two glass walls. These walls carry transparent electrodes which apply an electric field across the liquid crystal layer to cause a rotation of the molecules of liquid crystal material. The liquid crystal molecules in many displays adopt one of two states of molecular arrangement, one of which may be a voltage OFF state and the other a voltage ON state. Information is displayed by areas of liquid crystal material in one state contrasting with areas in the other state. One known display is formed as a matrix of pixels or display elements produced at the intersections between column electrodes on one walls and row electrodes on the other wall. The display is addressed in a multiplex manner by applying voltages to successive row and column electrodes. Another type of display is a shutter which is addressed in a direct drive manner.

Liquid crystal materials are of three basis types, nematic, cholesteric, and smectic each having a distinctive molecular arrangement.

The present invention concerns ferro electric smectic liquid crystal materials. Devices using this material form the surface stabilised ferroelectric liquid crystal (FLC) device. These devices can show bistability, ie the liquid crystal molecules, more correctly the molecular director, adopt one of two alignment states on switching by positive and negative voltage pulses and remain in the switched state after removal of the voltage. This behaviour depends upon the surface alignment properties. Some types of surface alignment will produce a device in which the switched states remain after removal of the voltage, other types of surface alignment will produce a device in which the states may randomly decay on removal of the voltage. The switched states may be stabilised by the presence of an ac bias. The actual states achieved may be dependent upon the amplitude of any ac bias present. The ac bias may be provided by the data (column) voltages in a mulitplexed device. This property, together with the fast switching speed, makes FLC devices suitable for large displays with a large number of pixels or display elements. Such ferroelectric displays are described for example in: N A Clark and S T Lagerwall, Applied Physics Letters Vol 36, No 11 pp 889–901, June, 1980; GB-2,166,256-A; U.S. Pat. No. 4,367,924; U.S. Pat. No. 4,563.059; patent GB-2,209,610 [Bradshaw end Raynes]; R B Meyer et al, J Phys Lett 36, L69, 1975.

The two switched states are made visible by arranging the liquid crystal cell between two crossed polarisers. One of the polarisers is aligned approximately parallel to one of the switched directions. This is known for example from GB 2,209,610.

To improve device legibility and device usefulness all device designers seek to obtain maximum contrast between the two switched states. The present invention improves this contrast of existing FLC devices.

SUMMARY OF THE INVENTION

According to this invention the contrast between the two switched states of a ferroelectric liquid crystal device is improved by rotating the polarisers from a crossed condition to obtain maximum contrast.

According to this invention a ferroelectric liquid crystal display device comprises a liquid crystal cell formed by a layer of a ferroelectric liquid crystal material arranged between two cell walls both carrying electrode structures and surface treated to alien liquid crystal material and two polarisers arranged on either side the cell characterised by the two polarisers arranged away from the crossed (90°) condition, the cell is rotated between the polarisers to obtain optimum contrast and an amount of ac bias is applied to the electrodes, the arrangement being such that contrast ratio between the two switched states of the display are optimised.

The two polarisers may be arranged up to 45°, preferably up to 20°, from the crossed condition. The polarisers may be neutral or coloured polarisers.

The cell may be rotated so that its two switched states are symmetric between the polariser's optical axes.

A full or partial reflector may be arranged behind the display so that the display may be observed by reflection.

The liquid crystal material may be a non chiral or chiral smectic, eg a $S_c^*$ or $S_I^*$. The switching characteristic the pulse width time against voltage curve, of the material may show a minimum value as shown for example in WO-89/05025, or a conventional material where the pulse width vs voltage curve is approximately linear.

Preferably the electrode structures are arranged as x-row electrodes on one cell wall, and y-column electrodes on the other cell wall forming an x,y matrix of addressable elements.

The x,y display device is addressed by voltage waveforms applied through driver circuits. During display operation an amount of ac bias may be applied to the electrodes to improve further the contrast ratio. Additionally the frequency of ac bias may be varied to improve the CR.

BRIEF DESCRIPTION OF THE DRAWINGS

One form of the invention will now be described, by way of example only, with reference to the accompanying drawings in which.

DETAILED DISCUSSION OF PREFERRED EMBODIMENTS

Figure 1:
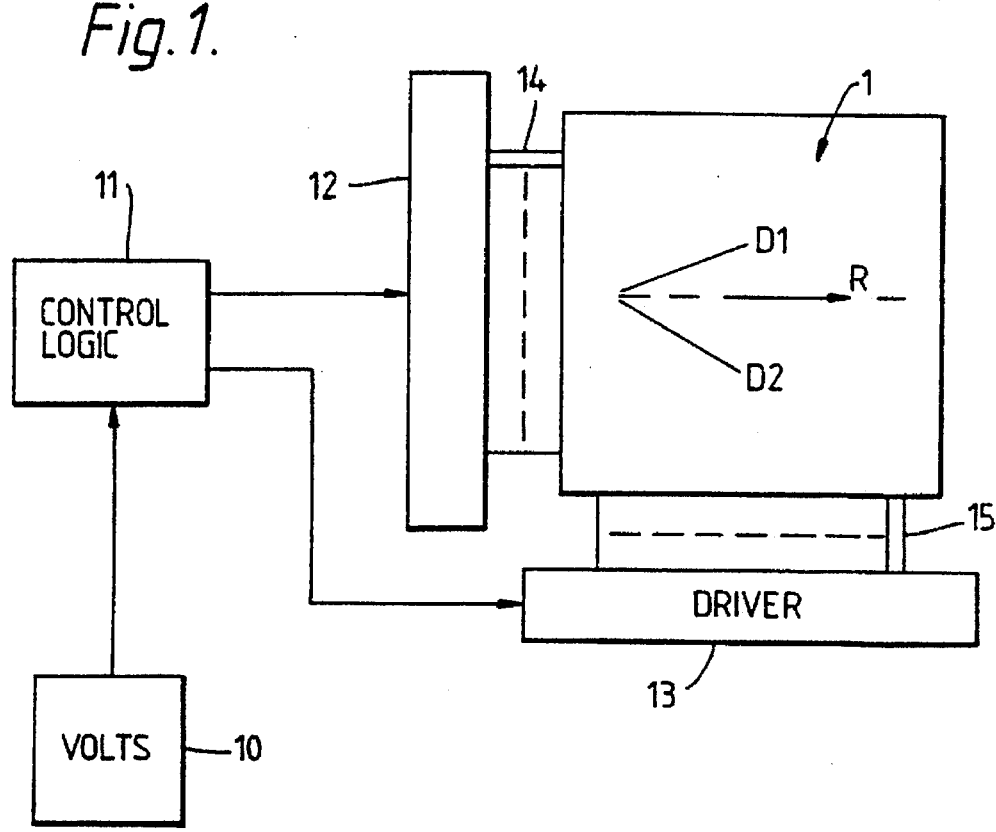
FIGS. 1, 2, are plan and section views of a liquid crystal display device.
Figure 2:
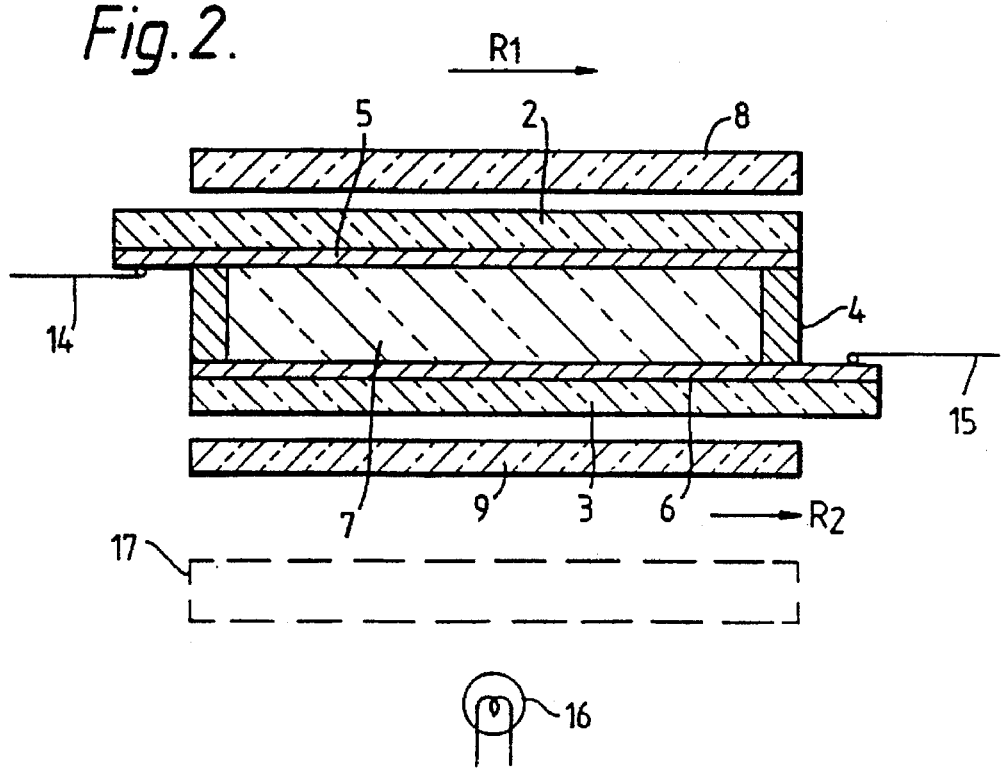

The cell 1 shown in FIGS. 1, 2 comprises two glass walls, 2, 3, spaced about 1–6 μm apart by a spacer ring 4 and/or distributed spacers. Electrode structures 5, 6 of transparent tin oxide are formed on the inner face of both walls. These electrodes may be of conventional row and column shape, seven segment, or an r-O display. A layer 7 of liquid crystal material is contained between the walls 2, 3 and spacer ring 4. Polarisers 8, 9 are arranged in front of and behind the cell 1. The alignment of the optical axis of each polariser is discussed later. A d.c. voltage source 10 supplies power through control logic 11 to driver circuits 12, 13 connected to the electrode structures 5, 6, by lead wires 14, 15.

The device may operate in a transmissive or reflective mode. In the former light passing through the device e.g. from a tungsten bulb 16 is selectively transmitted or blocked to form the desired display. In the reflective mode a mirror 17 is placed behind the second polariser 9 to reflect ambient light back through the cell 1 and two polarisers. By making the mirror 17 partly reflecting the device may be operated beth in a transmissive and reflective mode.

Prior to assembly the walls 2, 3 are surface treated by spinning on a thin layer of a polymer such as a polysmide or polyimide, drying and where appropriate curing; then buffing with a soft cloth (e.g. rayon) in a single direction R1, R2. This known treatment provides a surface alignment for liquid crystal molecules. The molecules (as measured in the nematic phase) align themselves along the rubbing direction R1, R2, and at an angle of about 0° to 15° to the surface depending upon the polymer used and its subsequent treatment; see article by S Kuniyasu et al, Japanese J of Applied Physics vol 27, No 5, May 1988, pp827–829. Alternatively surface alignment may be provided by the known process of obliquely evaporating silicon monoxide onto the cell walls.

Figure 3:
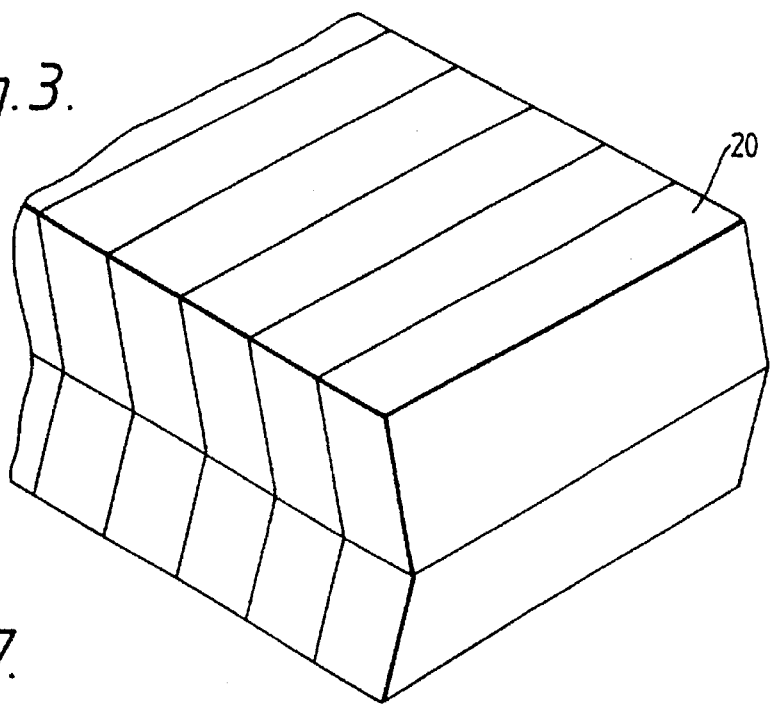
FIG. 3 is a stylised perspective view of layer of aligned liquid crystal material showing a chevron type of microlayer alignment.
Figure 4:
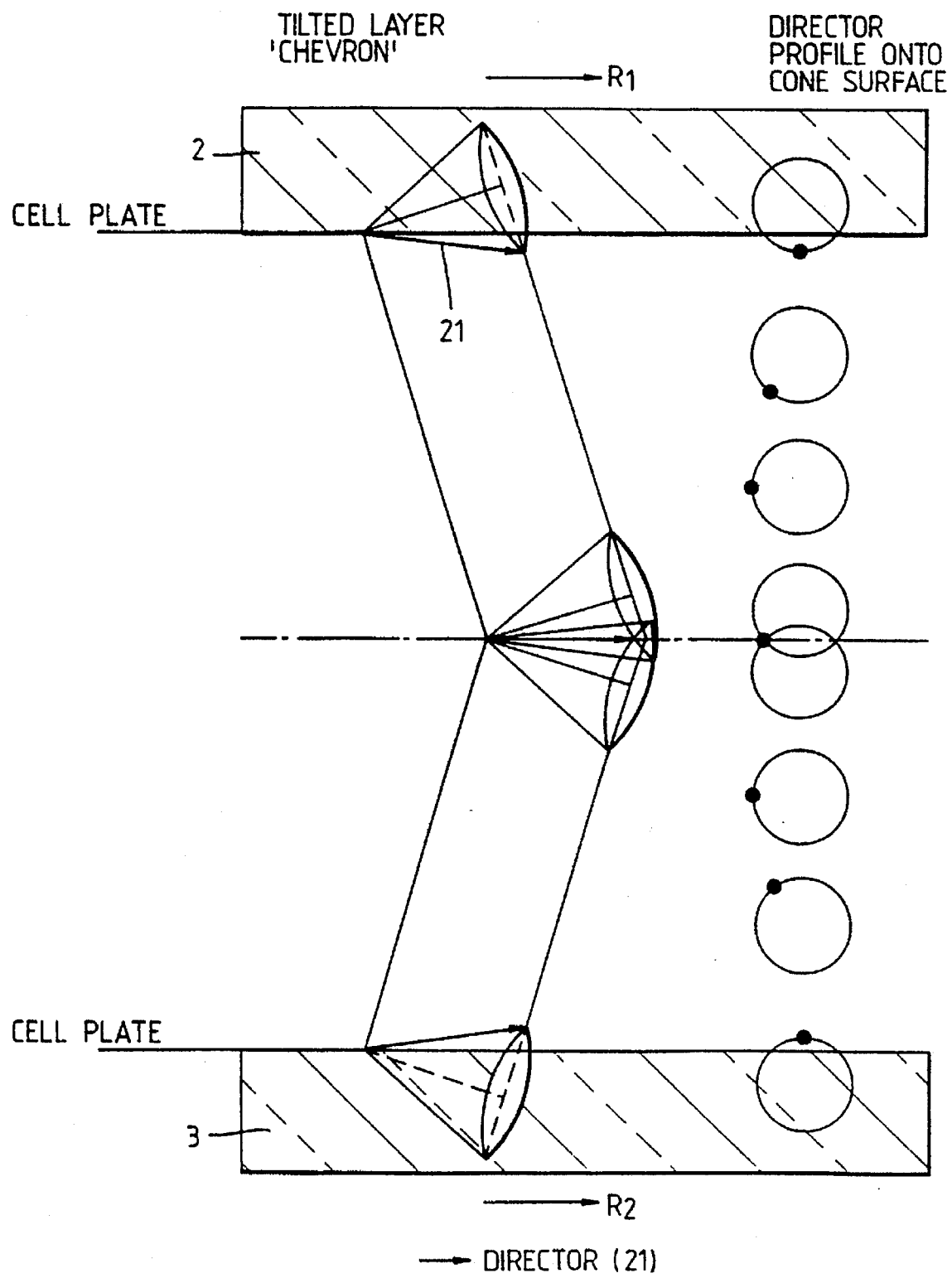
FIG. 4 is a stylised sectional view of part of FIG. 3 to a larger scale, one of several possible director profiles possible with the chevron structure.

The surface alignment treatment provides an anchoring force to adjacent liquid crystal materials molecules. Between the cell walls the molecules are constrained by elastic forces characteristic of the material used. The material forms itself into macro layers 20 each parallel to one another as shown in FIGS. 3, 4, which are specific examples of many possible structures. The Sc is a tilted phase in which the director lies at an angle to the layer normal, hence each molecular director 21 can be envisaged as tending to lie along the surface of a cone, with the position on the cone varying across the layer thickness, hence the chevron appearance of each macro layer 20.

Considering the material adjacent the layer centre, the molecular director 21 lies approximately in the plane of the layer. Application of a dc voltage pulse of appropriate sign will move the director along the cone surface to the opposite side of the cone. The two positions D1, D2 on this cone surface represent two stable states of the liquid crystal director, ie the material will stay in either of these positions D1, D2 on removal of applied electric voltage.

In practical displays the director may move from these idealised positions. It is common practice to apply an ac bias to the material at all times when information is to be displayed. This ac bias has the effect of moving the director and can improve display appearance. The effect of ac bias is described for example in Proc 4th IDRC 1984 pp 217–220. Display addressing scheme using ac bias are described eg in GB patent application No. 87.26996, PCT/GB 88.01004, WO89/05025 J R Hughes, GB patent application No. 90.17316.2, PCT/GB 91/01263, WO92/02925 J R Hughes and E P Raynes. The level of ac bias may be varied to co-operate with the polariser and cell rotation to further enhance the CR values.

Figure 5:
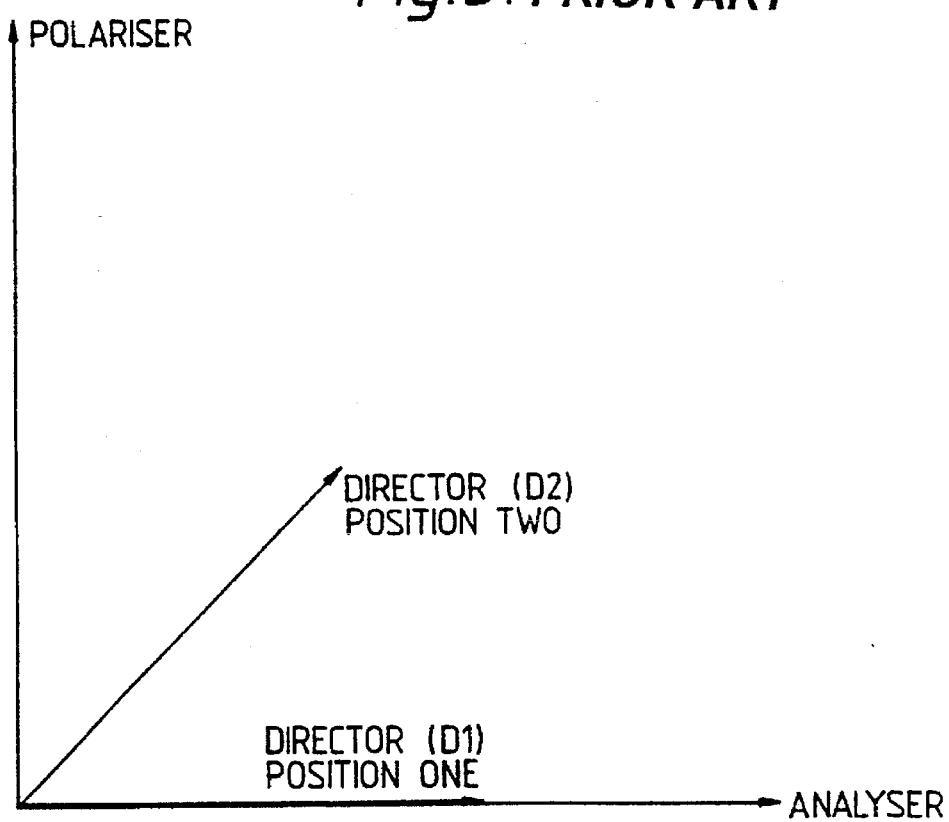
FIG. 5 is a diagram showing relative alignment of liquid crystal director in beth switched states and polariser alignment in prior art devices.
Figure 6:
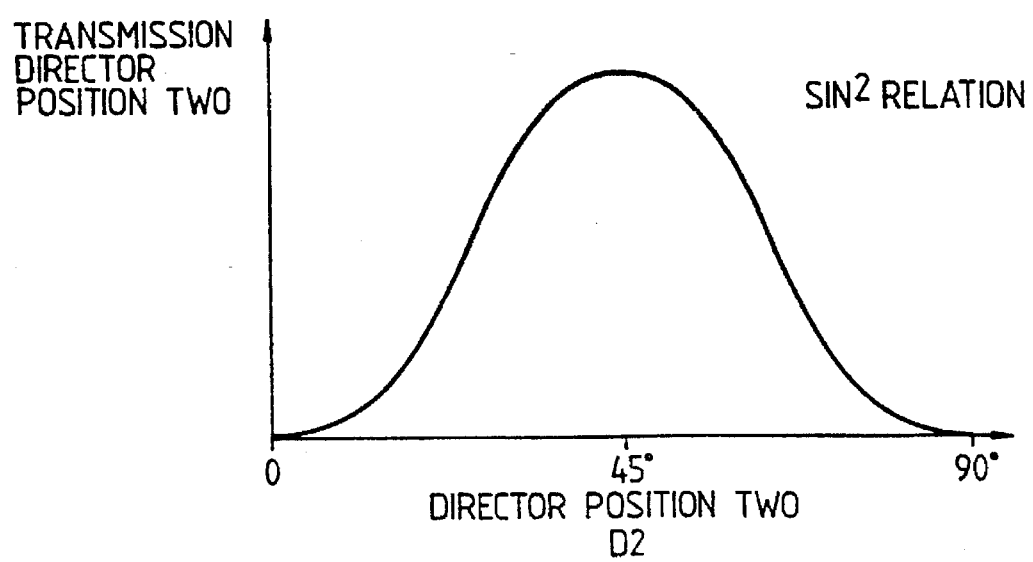
FIG. 6 is a graph of transmission against director alignment for the polariser alignment of FIG. 5.

For maximum contrast it is desirable for twice the apparent cone angle, or the angle between the director in the two switched states to be about 45°. This is explained with reference to FIGS. 5, 6. As seen in FIG. 5 one of the polarisers is aligned parallel to one of the two director positions D1, and shown as along the x-axis. The other director positions is given as D2. The second poleriser is aligned perpendicular to the first polarisers, ie along the y-axis. As shown by FIG. 6 maximum transmission occurs when director D2 is at 45° to D1. Prior art displays use crossed polarisers, ie the optical axis of the two polarisers ate at 90° to one another.

The present invention uses a different arrangement of polarisers as explained with reference to FIG. 7. Contrast ratio (CR), ie the ratio between light transmission in the two different states, is plotted on the y-axis against angular position between the two polarisers 8, 9 plotted along the a-axis. The polarisers 8, 9 are aligned at different angles in the range 60° to 120° and the cell rotated to obtain maximum contrast ratio. The value of maximum CR is plotted fop the different polariser angles at ac bias values of 0, 5 and 10 volts. The CR value is seen to vary considerably with angular position of the polarisers. Maximum CR occurs in FIG. 7 when the polarisers are about 85° apart for all the values of ac bias. The cell 1 is rotated so that the two switched directions D1, D2 are approximately equally angularly spaced between the optical axis of the polarisers 8, 9, ie R bisects the angle between polariser directions.

Figure 7:
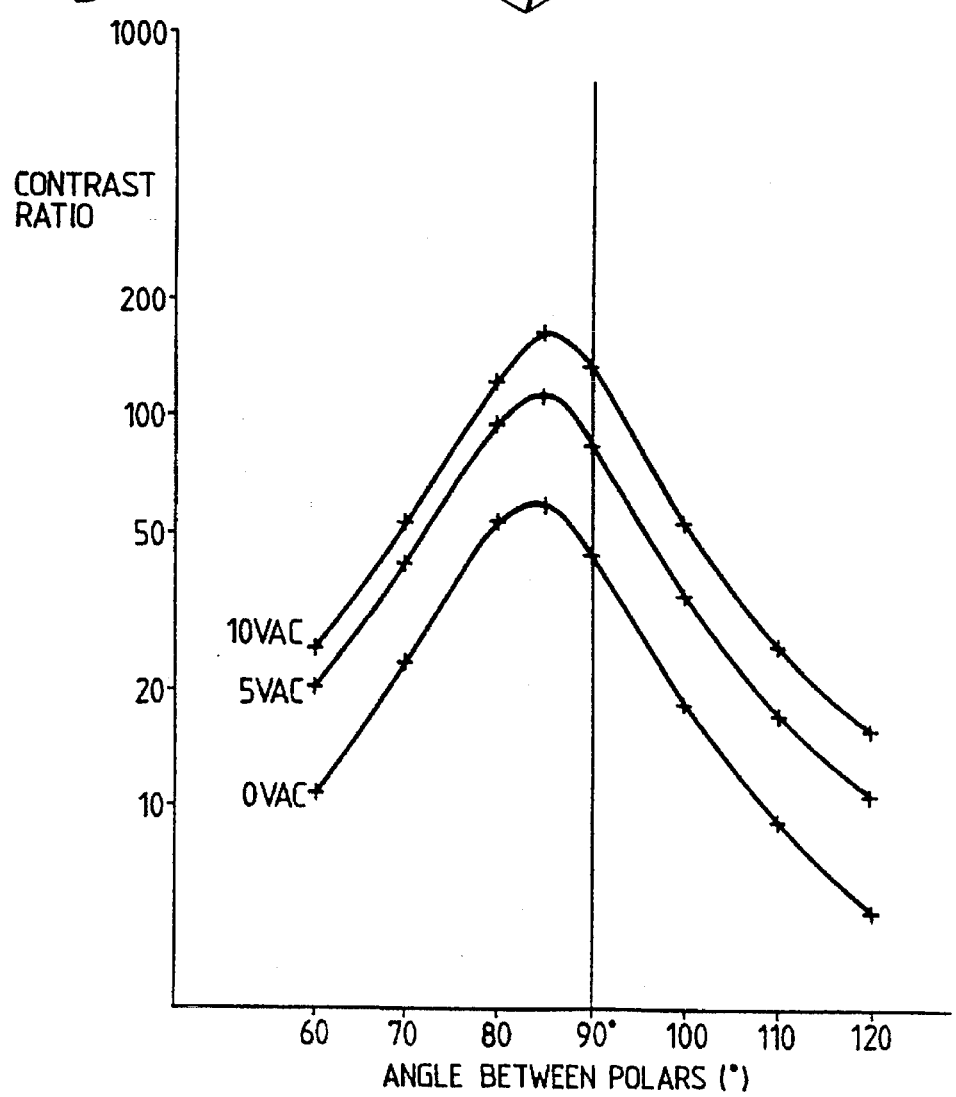
FIGS. 7, 8, 9 are graphs of contrast ratio against polariser angle at different amounts of AC bias for three different materials.

The device of FIG. 7 had material catalogue number Merck 5014-000 in a 2 μm thick layer with a polyimide surface alignment treatment. Measurements were made by switching the cell repeatedly between the two optical states with monopolar pulses of alternating polarity and 100:1 duty cycle with a 25 kHz ac square wave superimposed. This simulates behaviour under multiplex drive conditions. Contrast was measured with white light and an eye response filter at normal incidence. The CR improvement is obtained over a wide range of wavelengths.

TABLE 1

Material E Merck ZLI 5014-000 in a 2 μm thick layer, polyimide surface alignment

| ac bias Volts rms | CR with 90° polariser | CR | polariser angle (°) | CR gain |
| --- | --- | --- | --- | --- |
| 0 | 46 | 62 | 83 | 1.3 |
| 10 | 86 | 115 | 85 | 1.3 |
| 15 | 135 | 170 | 85 | 1.2 |

Figure 8:
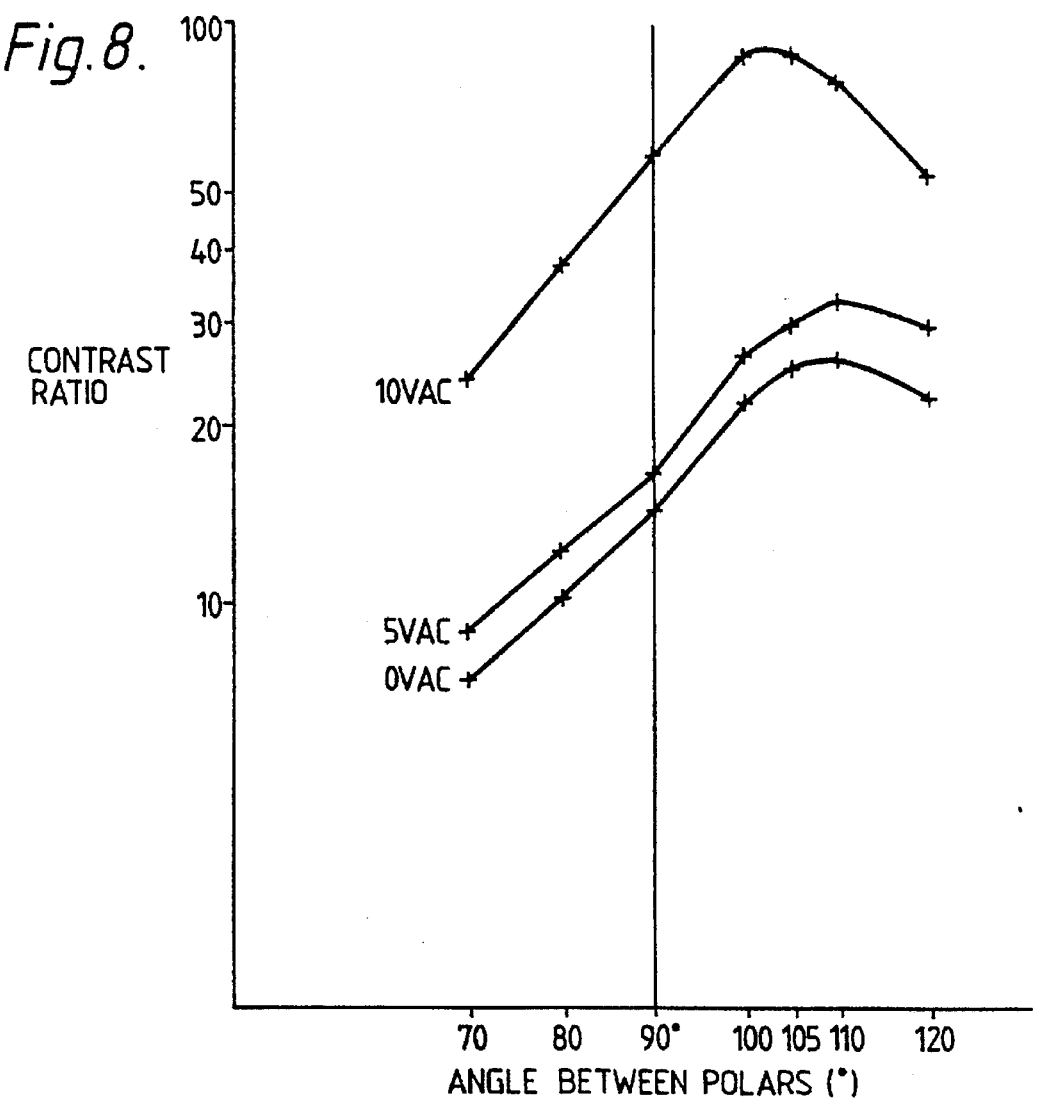

FIG. 8 shows contrast ratio variation with polariser angle for a different material at three different values of ac bias, using the same drive conditions as for FIG. 7. The exact angular maximum varies with ac bias. With smaller amount of ac bias the optimum polarisation angle is about 110°, and about 102° for the 10 volts ac bias.

Figure 9:
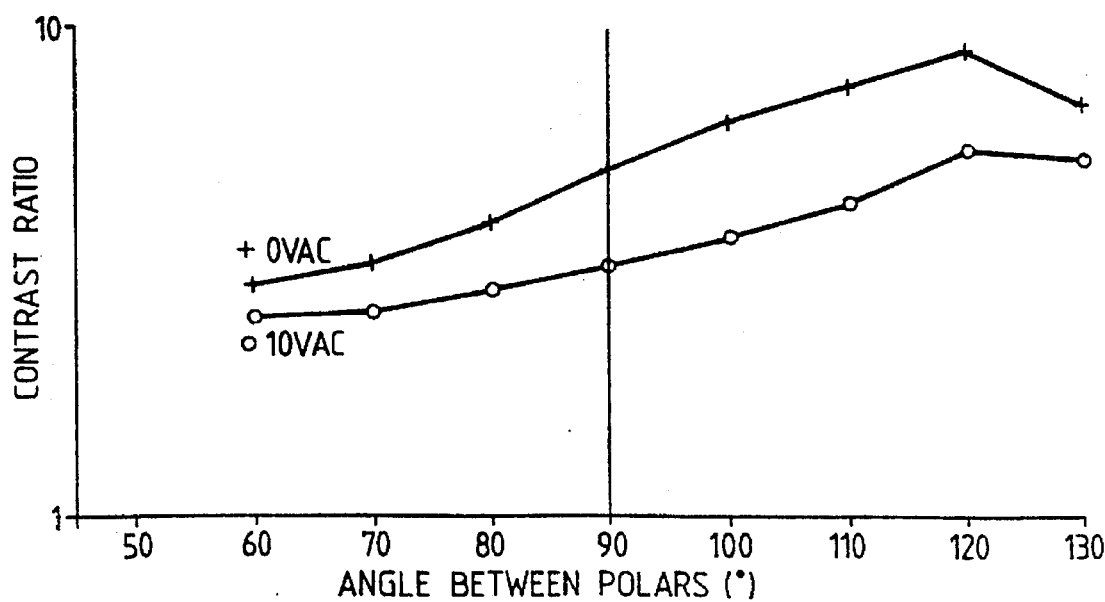

FIG. 9 shows CR variation with poleriser angle for the material BDH-SCE9. Further details are in Table 3 below.

TABLE 2

Material E Merck BDH 835 in a 2 μmm thick layer, polyimide surface alignment

| ac bias volts rms | CR 90° | CR | polariser angle (°) | CR gain |
| --- | --- | --- | --- | --- |
| 0 | 14.5 | 27 | 110 | 1.8 |
| 5 | 16.5 | 33.5 | 110 | 20 |
| 10 | 60 | 92 | 102.5 | 1.5 |

TABLE 3

Material E Merck BDH SCE9 in a 1.9 μm thick layer
with polyimide surface alignment, ac bias 25 KHz square wave

| ac bias volts rms | CR 90° | CR | polariser angles (°) | CR gain |
|---|---|---|---|---|
| 0 | 5.2 | 8.9 | 120° | 1.7 |
| 10 | 3.3 | 5.6 | 120° | 1.7 |

Material Merck ZLI 5014-000 has a spontaneous polarisation of −2.9 nC/cm$^2$@20° C.

Material Merck Ltd BDH 835 has a spontaneous polarisation of about 5 nC/cm$^2$@30° C.

Material Merck Ltd BDH SCE9 has a spontaneous polarisation of 28nC/cm$^2$ @30° C.

The angle between D1 and D2 for the cells noted above are: material 5014-000, 36°; material BDH 835, 40.3°; both measured with +/−5 volts at 50 Hz.

Another suitable material is BDH-SCE8.

The above examples are ferroelectric smectic C liquid crystal materials, other ferroelectric liquid crystal material may be used, for examples smectic I.

We claim:

1. A ferroelectric liquid crystal display device capable of being electrically switched to two contrasting display states, comprising:

a liquid crystal cell formed by a layer of a ferroelectric liquid crystal material arranged between two cell walls both carrying electrode structures and surface treated to align the liquid crystal material, said liquid crystal material having a molecular director and two polarisers, each polariser having an optical axis, arranged on either side the cell, wherein said two polarisers are arranged with their optical axes away from the crossed (90°) condition, said polarisers not aligned parallel to said molecular director at said cell wall and not aligned orthogonal to said molecular director at said cell wall and the cell rotated between the polarisers to obtain optimum contrast, and including a means for applying an amount of ac bias to the electrodes, the arrangement being such that contrast ratio between two switched states of the display are optimised.

2. The device of claim 1 wherein the electrodes are arranged as x-row electrodes on one wall and y-column electrodes on the other wall forming an x,y matrix of addressable elements.

3. The device of claim 1 and additionally including driver circuits for applying addressing voltage waveforms to the electrode structures.

4. The device of claim 3 and further comprising means for applying a variable amount of ac bias to further improve contrast.

5. The device of claim 1 wherein the angle between the polariser optical axes is greater than 45° and less than 135°.

6. The device of claim 1 wherein the angle between the polariser optical axes is greater than 70° and less than 110°.

7. The device of claim 1 wherein the cell is rotated so that its two switched states molecular directions are substantially symmetric between the polariser optical axes.

8. The device of claim 1 wherein the cell walls surface treatment is a rubbed polyimide.

9. The device of claim 1 wherein the liquid crystal material is a smectic c material.

* * * * *